(12) United States Patent
Lokkinen

(10) Patent No.: US 9,400,077 B2
(45) Date of Patent: Jul. 26, 2016

(54) TOOL AND A METHOD FOR RENOVATION OF A PIPE SYSTEM

(71) Applicant: Picote Oy Ltd, Porvoo (FI)

(72) Inventor: Mika Lokkinen, Porvoo (FI)

(73) Assignee: Picote Oy Ltd, Porvoo (FI)

( * ) Notice: Subject to any disclaimer, the term of this patent is extended or adjusted under 35 U.S.C. 154(b) by 203 days.

(21) Appl. No.: 14/095,939

(22) Filed: Dec. 3, 2013

(65) Prior Publication Data

US 2014/0157599 A1    Jun. 12, 2014

Related U.S. Application Data

(62) Division of application No. 13/266,798, filed as application No. PCT/FI2010/050335 on Apr. 23, 2010, now Pat. No. 8,621,731.

(30) Foreign Application Priority Data

Apr. 29, 2009    (FI) ...................................... 20095476

(51) Int. Cl.
*B29C 63/34* (2006.01)
*F16L 55/26* (2006.01)
*B29C 63/00* (2006.01)

(52) U.S. Cl.
CPC ............. *F16L 55/26* (2013.01); *B29C 63/0082* (2013.01); *B29C 63/34* (2013.01); *Y10T 29/49428* (2015.01); *Y10T 29/5168* (2015.01); *Y10T 29/5199* (2015.01)

(58) Field of Classification Search
CPC .......... F16L 55/26; F16L 55/265; F16L 55/30; F16L 2101/00; F16L 2101/10; F16L 2101/12; B21D 39/044; Y10T 29/49428; Y10T 29/5168; Y10T 29/5199
See application file for complete search history.

(56) References Cited

U.S. PATENT DOCUMENTS 3,653,856 A * 4/1972 Field ...................... B24D 13/06
451/469
4,893,389 A * 1/1990 Allen .................... F16L 55/179
138/98

FOREIGN PATENT DOCUMENTS

JP        2003326408       11/2003

* cited by examiner

*Primary Examiner* — Christopher Besler
(74) *Attorney, Agent, or Firm* — Rolf Fasth; Fasth Law Offices

(57) ABSTRACT

The machining device is for machining the material of a pipe system that has a joint area between a pipe that has a smaller inner diameter and a pipe that has a larger inner diameter. The device has protruding parts that have been adapted to position the device inside the pipe that has the smaller diameter. A steerable actuator is adapted for removing material from the joint area and steering device for controlling the direction of the machining device in relation to the longitudinal axis of the pipe that has the smaller inner diameter while removing material from the joint area. The method is for machining material of the joint area that has a thinner and a thicker pipe.

5 Claims, 10 Drawing Sheets

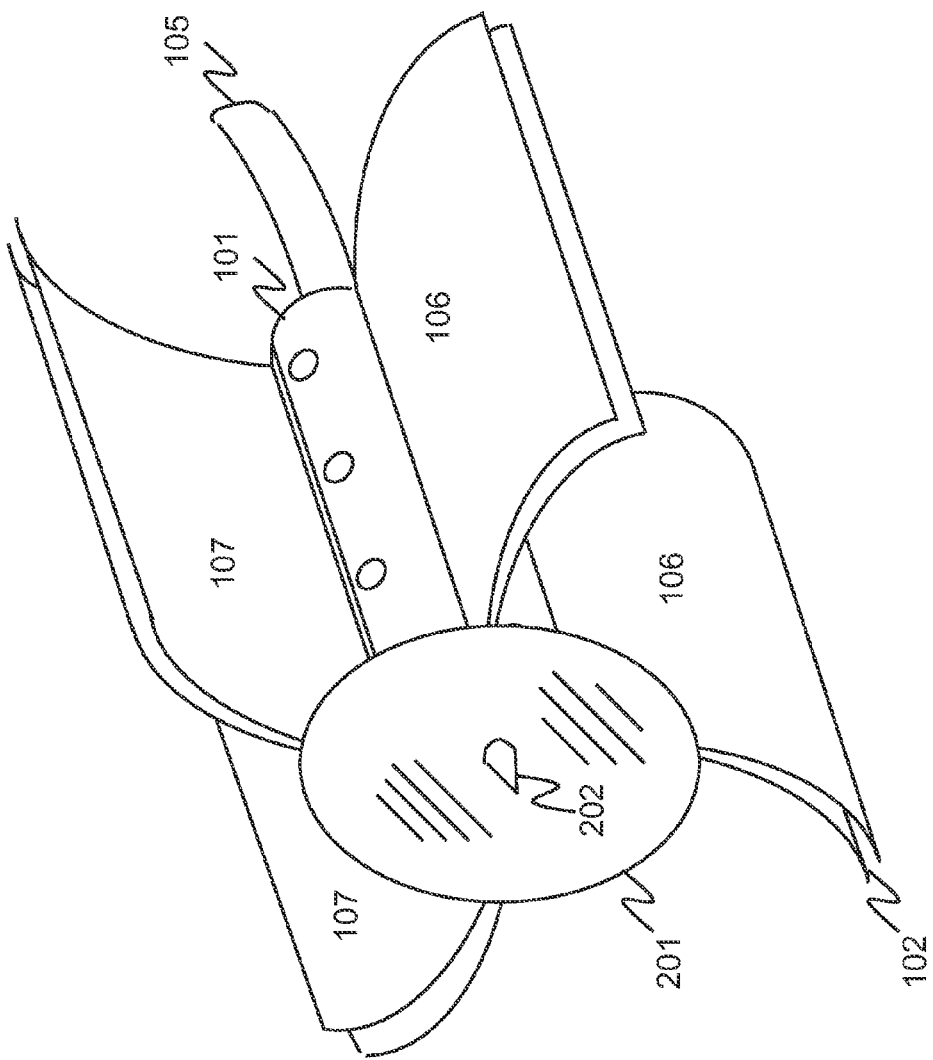

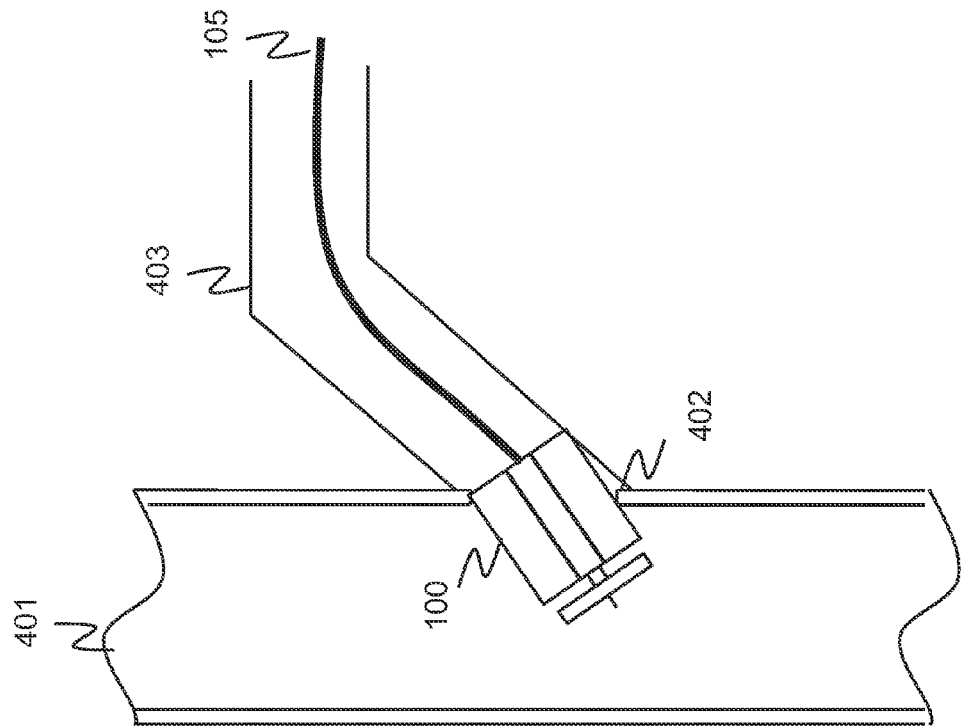
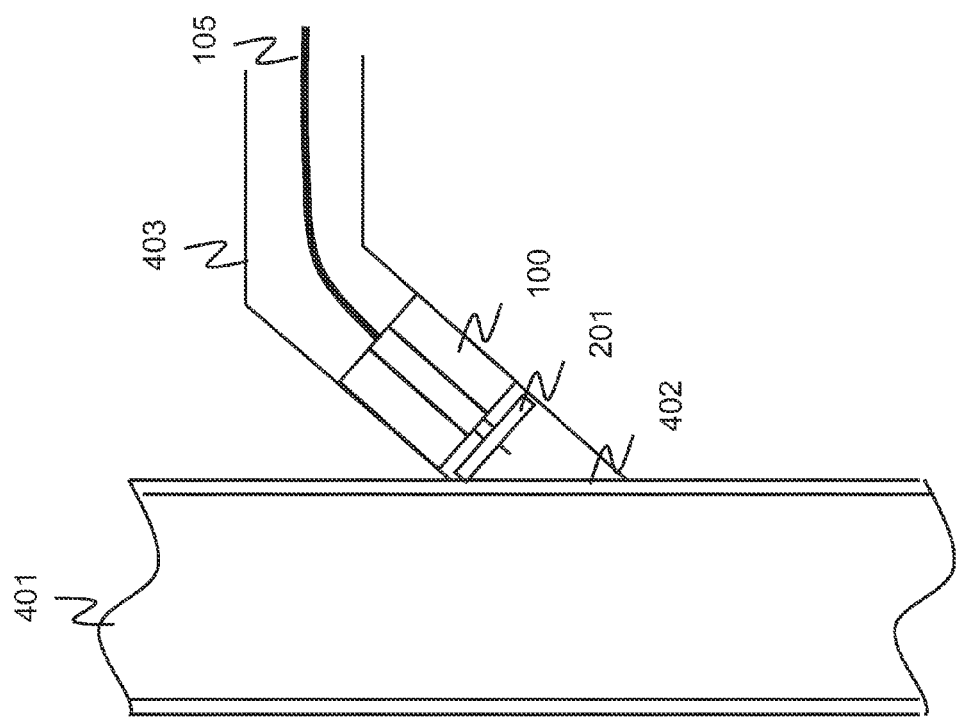

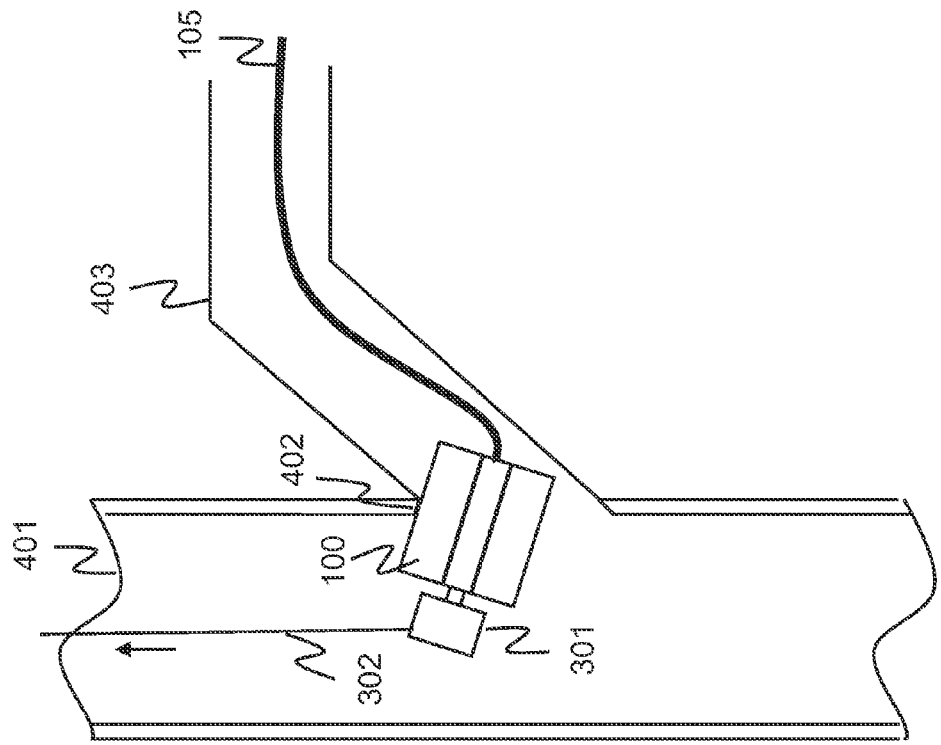
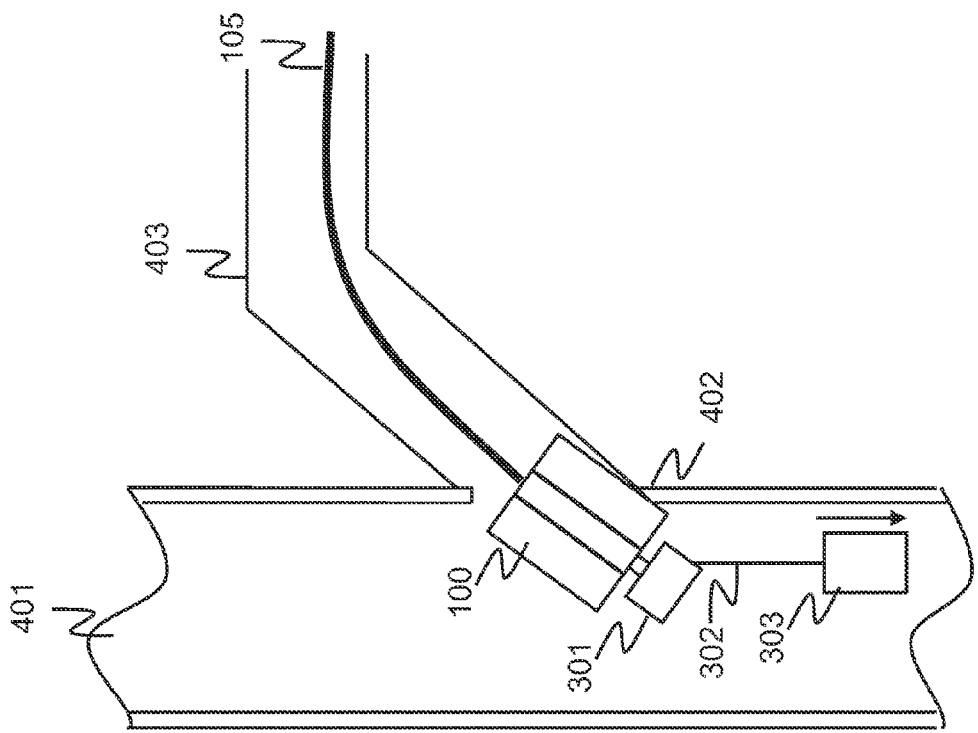
Fig 4D
Fig 4C

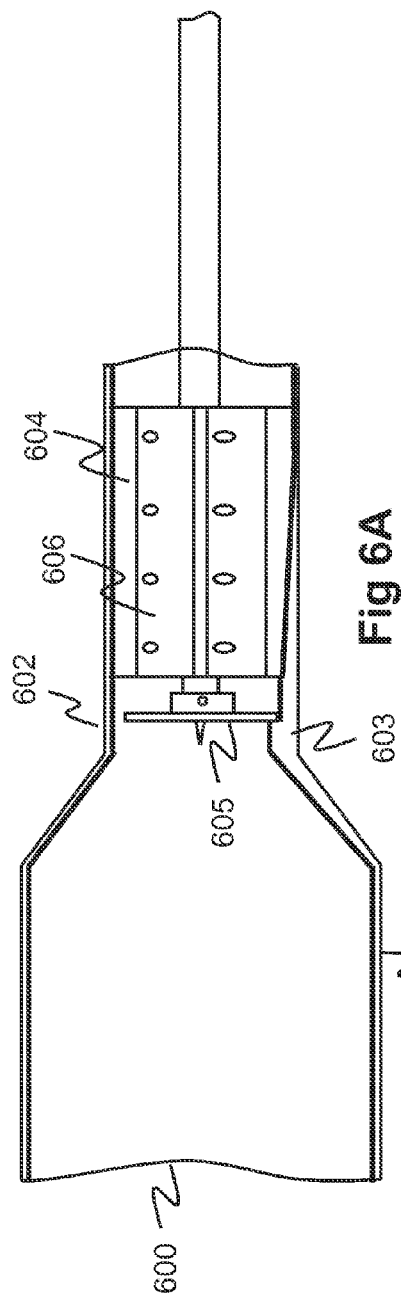
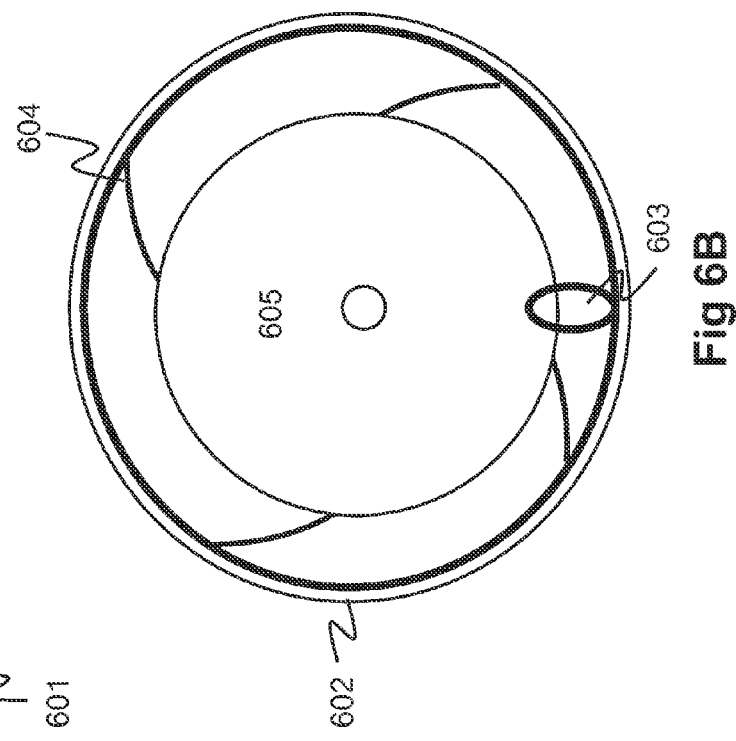

TOOL AND A METHOD FOR RENOVATION OF A PIPE SYSTEM

PRIOR APPLICATIONS

This is a divisional application of U.S. national phase patent application Ser. No. 13/266,798, filed 28 Oct. 2011, that claims priority from PCT/FI2010/050335 filed 23 Apr. 2010, that claims priority from Finnish Patent Application No. 20095476, filed 29 Apr. 2009.

FIELD OF THE INVENTION

The invention concerns generally a device and a method for renovating a pipe system. Specifically, the invention concerns a device and a method for machining the inner surface of a pipe system, especially at a joint area of the pipe system.

BACKGROUND AND SUMMARY OF THE INVENTION

The pipe assemblies, for example the sewers of buildings, are typically renovated by changing the pipes entirely to new ones or lining the inner surfaces of the existing pipes using some suitable lining technique and material.

When changing the pipes of the building to entirely new ones, some structures of the building may need to be destroyed, e.g. by chiseling, in order to remove the old pipes from the walls of the building. Destroying and rebuilding the wall structures is expensive, dirty and time consuming work. Because of the noise and dust caused by the renovation work, it is often impossible to live in the building during the renovation.

Pipe systems may also be renovated by coating their inner surfaces. One such technique is so called lining technique where a liner sleeve is slid into the sewer being repaired and impregnated using some suitable material, e.g. epoxy resin, upon hardening of which a continuous and tight pipe is formed. The lining is stiff, acid proof and environment friendly, among others. The thickness of the wall of the sleeve is 2-4 mm, depending on the diameter of the pipe, and its smooth inner surface guarantees excellent flow properties. The durability, environmental safety and life of the installed and hardened pipe are comparable to the respective properties of new pipes.

One problem with the lining technique is, that when the sleeve has been installed e.g. into a thick vertical main line of a pipe system, all joints leading e.g. to thinner pipes coming from the apartments of a residential building are blocked. Holes must thus be drilled to the joints in order to allow waste water to flow from the pipes coming from the apartments to the main line. In prior art solutions, these holes are drilled from the main line using e.g. a robot bore. The robot bores are large, expensive and complex devices whose operation requires special skills from their user. As a result of erroneous operation, the hole may be drilled partially or entirely into wrong location or at least the finish may remain rough. Such quality is typically not acceptable, because waste may stick onto the rough areas of the sewer pipe and accumulate over time into thicker layer and eventually even block the sewer. Neither is it acceptable, that standing water remains in the rough spots of the joint area. Another problem with the robot bores is their unsuitability for use in main lines having bends in them. Because of its size, it may not be possible to move the robot bore in the main line to the position where the hole should be bored.

Because of the problems related to the lining techniques, their popularity in the pipe system renovation projects has remained rather small. By solving these problems, the efficiency of pipe renovation may be significantly improved and thus the cost of renovation may be lowered.

The object of the present invention is to disclose a device and method for machining pipe assemblies, e.g. sewer pipes of a residential building, and especially their joint areas.

An aspect of the present invention is a machining device for machining the material of e.g. a pipe system comprising a joint area between a pipe having a smaller inner diameter and a pipe having a larger inner diameter. The device is characterized in that it comprises protruding parts, that have been adapted to position the device or at least a part of it inside the pipe of the pipe system having the smaller diameter, steerable and e.g. actuator operable means for removing material from the joint area of the pipe system and steering device for controlling the direction of the machining device in relation to the longitudinal axis of the pipe having thinner diameter in the pipe system while removing material from the joint area of the pipe system.

The machining device may comprise a rotatable spindle which may be coupled for example to an external actuator. In an embodiment, the protruding parts positioning the device may be attached to this rotatable spindle.

The material to be removed may be e.g. the construction material of the pipe or suitable lining material, e.g. a polyester sleeve impregnated with epoxy resin, that has been attached to the inner surface of the pipe.

The pipe system advantageously comprises a thinner and a thicker pipe. "Thinner" and "thicker" refer herein to the inner diameters of the pipes. The device according to an embodiment of the invention may be adapted to machine the material of a joint area of the pipe system from inside of the thinner pipe of the assembly. The thinner pipe of the pipe system may be joined with the thicker pipe in any angle, typically however in the angle of 30-60 degrees, most advantageously in the angle of 45 degrees.

The machining device may be adapted to be operated from the thinner pipe of the pipe system being machined.

The machining device may be adapted to be steered in at least one direction from the thicker pipe of the pipe system being machined.

The protruding parts to be attached to the spindle of the machining device may be adapted to be attached to the spindle in a radial manner.

The positioning of the machining device may mean e.g. centering of the spindle inside the thinner pipe of the pipe system.

The means for removing material may be adapted to remove material from the pipe system for example by sanding, honing or cutting. In a preferred embodiment the motion causing the honing or cutting is a rotating motion. The means for removing material may be adapted to puncture from inside of the thinner pipe a hole to the lining installed into the thicker pipe of the pipe system and/or to hone the edges of the punctured hole.

The means for removing material may be adapted to be steerable for example by positioning the removing means or its part to a desired position inside the pipe, e.g. to the center of the pipe, by deviating the rotational axis of the removing means or directing the rotational axis of the removing means to a desired direction.

The protruding part may advantageously be adapted to lean to the pipe of the pipe system in a flexible manner, for example using elastic or pneumatic force. The protruding part, which may be adapted to be attached to the rotatable spindle of the machining device, may comprise e.g. brushes, a rough sanding surface or other suitable, e.g. grinding or chipping means for removing material from the pipe system, e.g. from its joint area, e.g. from the edges of a hole made to the joint area.

The protruding part may also comprise one or multiple lamellae that, when bent, cause an elastic force. The lamellae may comprise for example abrasive band. Some reinforcement member made of e.g. rubber or other suitable material may be attached to the abrasive band e.g. by molding or laminating to effect the elastic force and/or to improve the strength of the abrasive band.

The machining device may also comprise a steering device for controlling the longitudinal (rotational) axis of the spindle of the machining device in relation to the longitudinal axis of a pipe of the pipe system, for example by deviating the machining device from the direction of the longitudinal axis of the pipe or keeping the machining device in a certain direction, e.g. in the direction of the longitudinal axis of a pipe. The steering device may be mounted on a bearing so that the rotating movement of e.g. the spindle of the machining device does not transmit to the steering device. The steering device may comprise some suitable deviating device, e.g. a bendable wire, rope or cable. In an embodiment, a weight element may be attached to the rope or cable. In some embodiments, the deviating device may also be some suitable rigid structure, e.g. a rod.

The machining device may also comprise e.g. detachable means for puncturing a hole to the joint area of the pipe system. Such means may comprise e.g. a surface that sands or chips material from the location of the hole to be made. The surface may be e.g. a plate or a suitably formed curved surface. The surface may comprise a roughening made of hard metal pieces or some other suitable material. In an embodiment of the invention, the grinding or chipping function may be achieved with a suitably selected form of the surface, e.g. with sharp edges.

The machining device may advantageously also comprises a bendable-torque transmitting-member, e.g. a cable, that has been attached to the spindle of the machining device and that may rotate the spindle using an actuator. The torque transmitting member may thus be adapted to be attached to a torque producing actuating device. This member or some other suitable members attachable to the device may advantageously be used for moving (pushing and pulling) the machining device inside the thinner pipe of the pipe system.

A second aspect of the present invention may be a machining device for machining material of e.g. a joint area of a pipe system comprising a thicker and a thinner pipe.

The machining device is characterized in that it comprises bendable abrasive bands attachable to the rotatable spindle of the machining device. The abrasive bands are adapted to position and/or direct the machining device inside the pipe of the pipe system and to sand the inner surfaces of the pipe. In addition to the abrasive bands, a blade may be adapted to be attached to the rotatable spindle for the purpose of removing material from the pipe system, e.g. from the joint area of the thinner and thicker pipe.

A third aspect of the invention is a method for machining the joint area of a pipe system comprising a thinner and a thicker pipe. In the method, a machining device according to e.g. an embodiment of the first or second aspect of the invention may be used.

The method may thus be characterized in that in the method a hole is punctured from inside of the thinner pipe to the thicker pipe in the joint area of the pipe system and the edges of the punctured hole are ground (sanded), e.g. to the same level with the inner surface of the thinner pipe, using a rotatable steerable sanding device, the direction of the rotational axis of which may be controlled while sanding the edges of the punctured hole.

The punctured hole may, before the sanding, may have a diameter that is e.g. at least 1%, 5% or 10% smaller than the inner diameter of the thinner pipe of the pipe system. The hole may be punctured e.g. using a self-positioning or steerable puncturing device, e.g. a bore attached to centering means. While sanding the edges of the hole, the rotational (longitudinal) axis of the sanding device may be controlled, e.g. deviated from the direction of the longitudinal axis of the thinner pipe using a steering device or the sanding device may be kept in a certain direction using the steering device, e.g. in the direction of the thinner pipe. Advantageously, the sanding of the hole may be performed from the thinner pipe of the pipe system. While sanding the edges of the punctured hole, the device may be steered e.g. from the thicker pipe of the pipe system.

In the following detailed description, a preferred embodiment of the device and the method is described.

BRIEF DESCRIPTION OF THE DRAWINGS

In the following, the invention is described in more detail referring to exemplary preferred embodiments and accompanying figures, where

FIG. 2A is a perspective view of the machining device of the present invention having a disc for puncturing a hole;

FIG. 4A is a cross-sectional view of the machining device of the present invention inside a pipe system;

FIG. 4B is a cross-sectional view of the machining device of the present invention inside a pipe system;

FIG. 4C is a cross-sectional view of the machining device of the present invention inside a pipe system;

FIG. 4D is a cross-sectional view of the machining device of the present invention inside a pipe system;

FIG. 6A is a cross-sectional side view of the machining device of the present invention inside a pipe system having a varying diameter: and FIG. 6B is a cross-sectional view of the machining device shown in FIG. 6A used for honing an inner surface and joint area of the pipe system.

DETAILED DESCRIPTION

Figure 1:
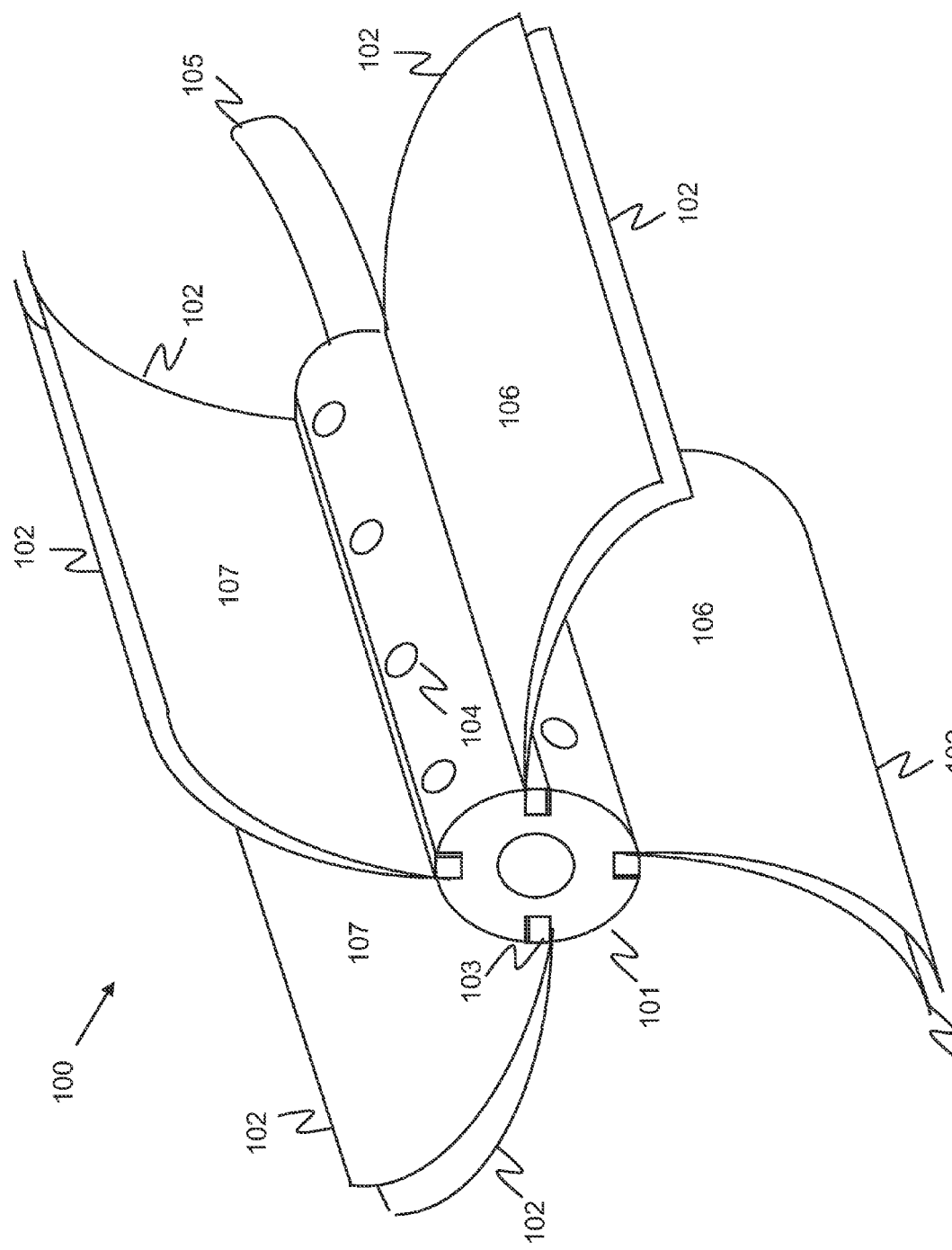
FIG. 1 is a perspective view of the machining device of the present invention.

FIG. 1 depicts a part of a machining device 100 of an embodiment of the invention. The device comprises a spindle 101 to which a set of protruding parts 102 are attached radially. The protruding parts are advantageously arranged symmetrically around the rotational axis of the spindle. One function of the protruding parts is to position, e.g. by centering, the spindle inside the pipe of a pipe system and keep the longitudinal axis of the spindle 101 in the direction of the longitudinal axis of the pipe. The protruding parts 102 may be attached e.g. to the grooves 103 using fastening screws 104. A flexible, torque transmitting cable 105 may be attached to the spindle. A device rotating the machining device, e.g. a motor that rotates the spindle of the machining device at a suitable speed, may be attached to the other end of the cable (not shown in the figure). In a preferred embodiment, the rotating speed of the spindle may be e.g. 1000-4000 RPM. The structure shown herein allows constructing the device for machining inner surfaces of relatively thin sewer tubes, e.g. those having inner diameter between 32-100 mm.

In a preferred embodiment the protruding parts 102 comprise abrasive band 106 which may be strengthened from the smooth side 107 of the abrasive band with e.g. rubber, Kevlar or other suitable material that provides the protruding part with elastic flexibility and improves the strength of the protruding part e.g. against tearing. Because the flexibly (elastically) bendable mutually similar protruding parts are arranged in this embodiment symmetrically around the spindle, the protruding parts together position the spindle always in the center of the pipe that is being machined using the device. The protruding parts also keep the spindle in the desired direction. In this embodiment, the elastic bendable protruding parts comprising abrasive band act also as rotatable means for removing, by sanding, material from the joint area of the pipe system (and also from elsewhere from the pipe being worked on).

In FIG. 2a, a machining device according to an embodiment of the present invention is depicted. In this embodiment, a round disc 201, in the middle of which there may also be a peg 202, has been attached to the device. The surface of the disc 201 may comprise material or shapes suitable for grinding or cutting material. Some hard metal pieces may be attached to the surface or the surface may have patterns, e.g. sharp saw-edged forms, suitable for machining the material. The disc 201 is typically used for puncturing a hole to a lining surface (e.g. polyester sleeve impregnated with epoxy resin) from the thinner pipe of a pipe system. This working phase is described in more detail in FIGS. 4a and 4b. It should be noted, that because the protruding parts 102 center the spindle 101 in the pipe and keep the rotational axis of the spindle in the direction of the longitudinal axis of the pipe, the springy protruding parts act as the steering device of the disc 201 that is in this embodiment the device for removing material.

Figure 2B:
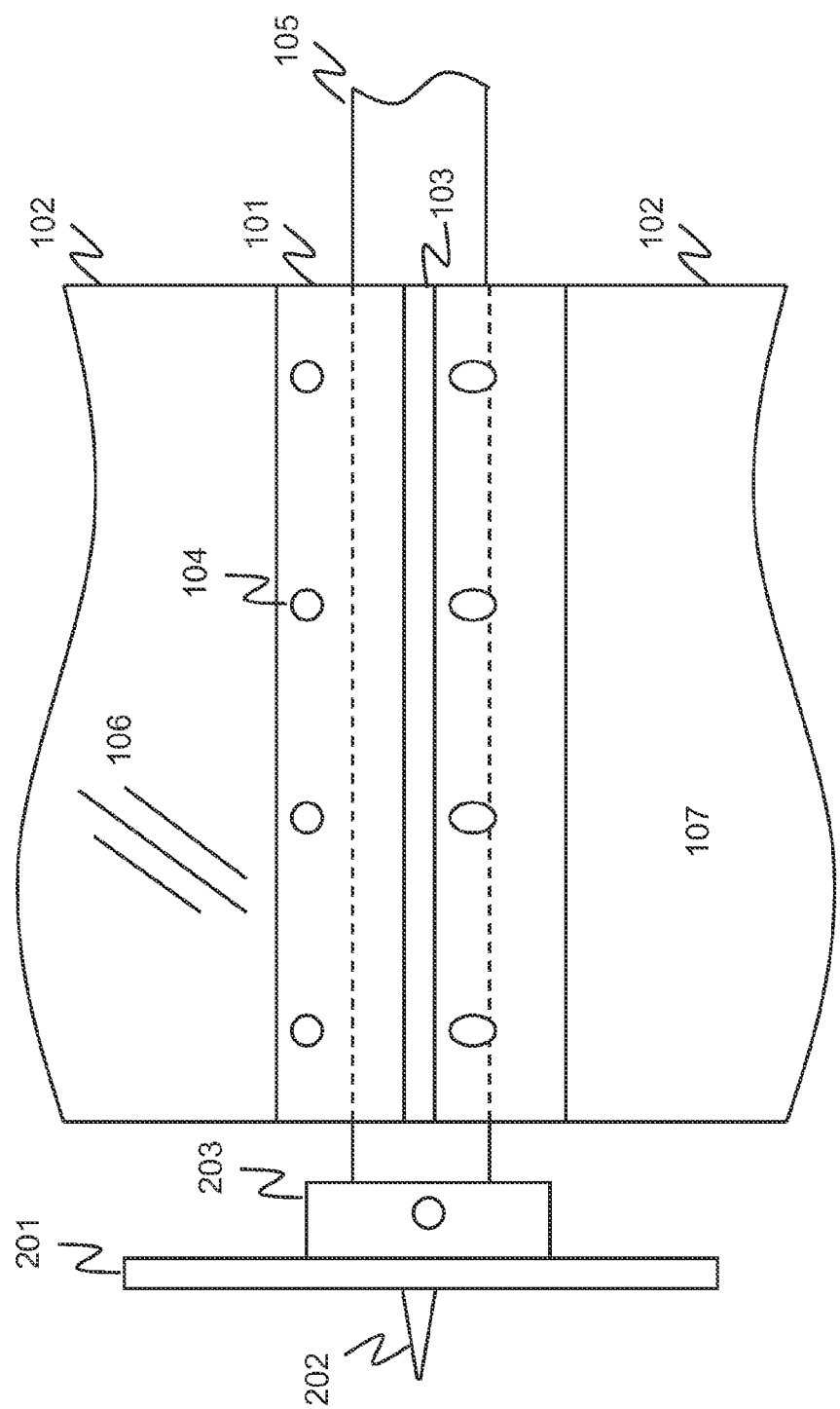
FIG. 2B is a cross-sectional view of the machining device shown in FIG. 2A.

In FIG. 2b the arrangement of FIG. 2a is presented from another angle of view. The disc 201 has attachment members 203 for attaching, e.g. in a removable manner, the disk to the machining device 100, for example to its spindle 101.

Figure 3A:
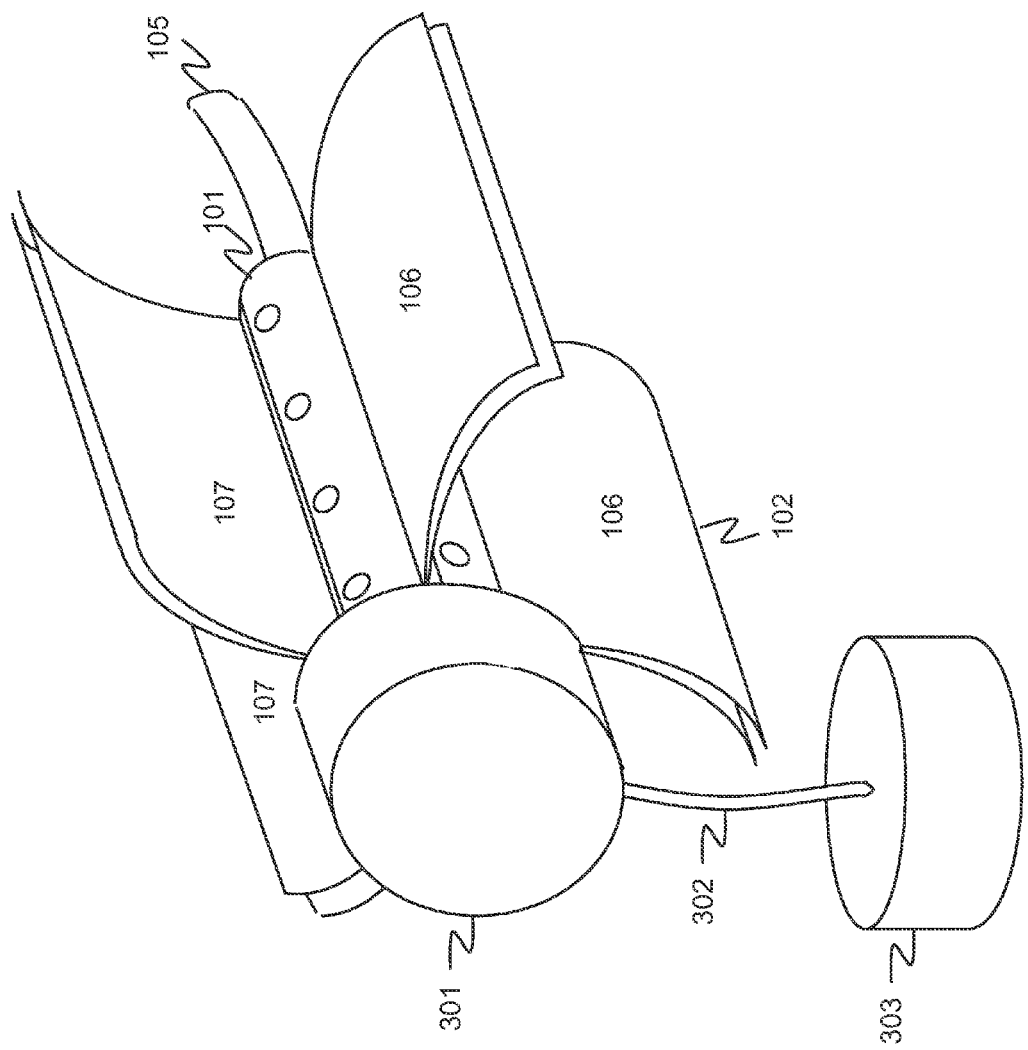
FIG. 3A is a perspective view of the machining device of the present invention having a steering device attached thereto.

In FIG. 3a, a machining device according to another embodiment of the present invention is shown. In this embodiment, a bearing-mounted steering device 301, that comprises a bendable rope or cable 302, has been attached to the device. The direction of the spindle 101 may be deviated in a controlled manner by pulling the cable 302 when sanding the edges, especially the upper and lower edges, of the hole punctured to the pipe system. In an embodiment, the deviating force may be effected using a weight 303. The desired deviating force may also be effected by pulling from the cable by hand.

Figure 3B:
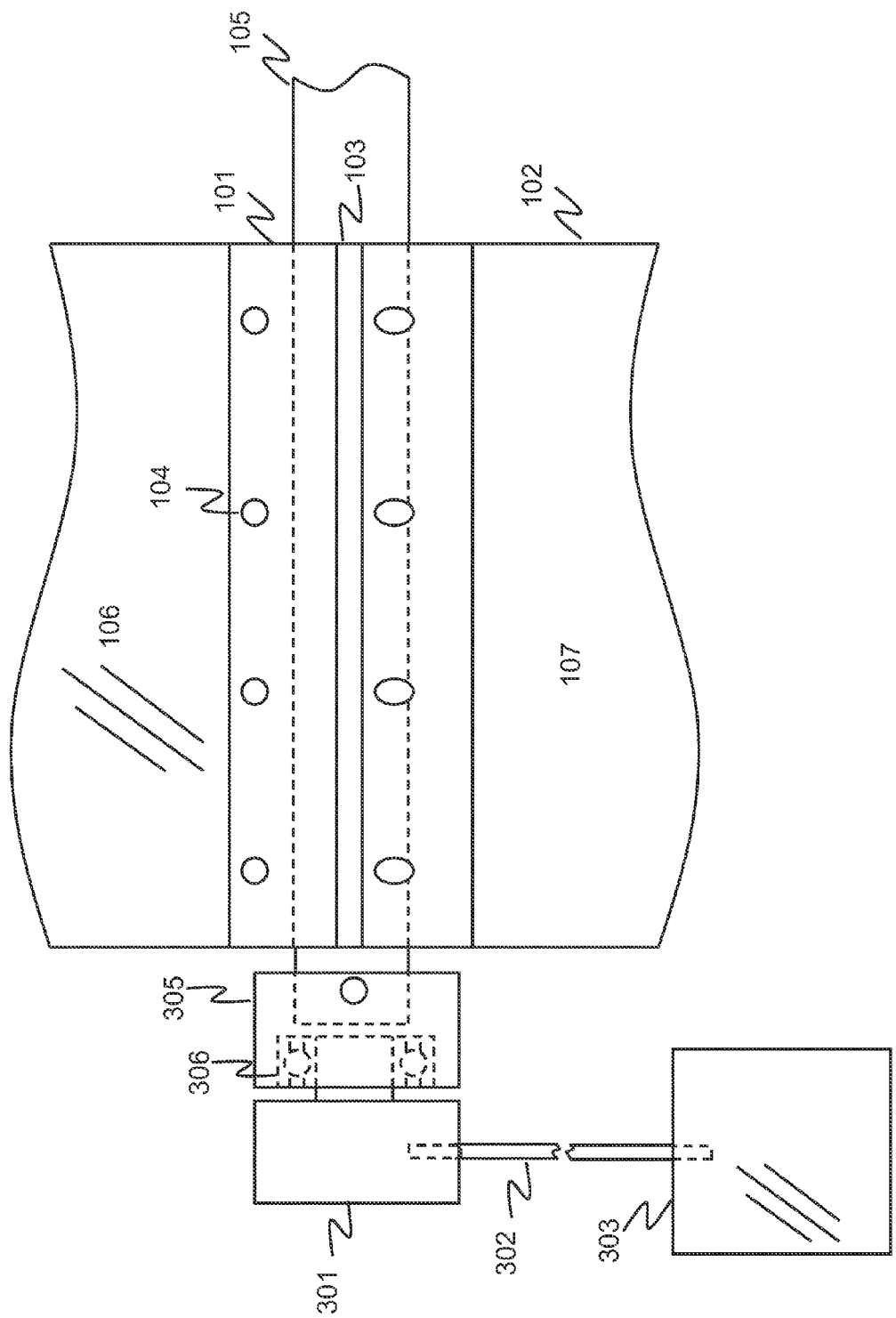
FIG. 3B is a cross-sectional view of the machining device shown in FIG. 3A.

In FIG. 3b, the device of embodiment of FIG. 3a is shown from another angle of view. The steering device 301 has been attached, e.g. in a removable manner, using a bearing-mounted 306 attachment member 305 to the spindle 101 of the machining devices. This way, the rotation of the steering device and especially its cable along with the spindle, may be prevented.

FIGS. 4a-d depict in an exemplary manner the use of the machining device of an embodiment of the invention for machining the material of a joint area of a pipe system being renovated. The pipe system of the example has a thicker pipe 401, for example the main line of a sewer, which has been coated using e.g. a lining method. As the result of the lining, the sleeve 402 blocks the branch line 403 coming from an apartment of the building. A hole must be punctured to the sleeve in order to make the branch line 403 available for use again. For puncturing the hole, the machining device 100, at one end of which the disk 201 has been attached, is pushed to the branch line 403 using cable 105. It should be noted that the branch line 403 may have several bends of up to 90 degrees. The machining device must be dimensioned in terms of its length, diameter, flexibility of the protruding parts 102 and accessories attachable to the device, e.g. the disk 201 or steering device 301, so that the device can be pushed through such bends. When pushing the device forward in the pipe 403, e.g. using the cable 105, the machining device is rotated using the cable 105. The device thus sands, using the abrasive bands 106 of the protruding parts 102 the inner walls of the branch pipe. The walls to be sanded may have been coated earlier with a coating material, e.g. a polyester sleeve impregnated with epoxy resin. When the machining device 100 reaches the joint area between the main line 401 and the branch line 403, the disk 201, which is centered in the middle of the branch line pipe 403 by the protruding parts 102 of the device 100, starts puncturing a hole to the sleeve 402. Because the diameter of the disk 201 is e.g. 10% smaller than the inner diameter of the branch line pipe, a "collar" as shown in FIG. 4b, remains in the joint area. The collar must be ground (sanded) off to achieve satisfactory finish quality. Because the thinner branch line from an apartment of the building has been joined to the thicker main line at an angle of e.g. 45 degrees, the relatively short machining device attempts to turn in an uncontrollable manner when entering the thicker pipe from the thinner pipe. The machining device must be relatively short in order to be able to be pushed through the possible bends in the branch line. In order to properly sand the edges, especially the lower edge, of the hole, the uncontrolled turning tendency of the device must be controlled using a steering device. The control may comprise e.g. turning the device away from the direction of the branch line or keeping the rotational axis of the spindle in a certain direction, e.g. in the direction of the longitudinal axis of the branch line.

FIG. 4c illustrates how the collar of the lower edge of the hole may be ground into a smooth surface utilizing the steering device 301 attached to the machining device 100, which steering device in this example comprises a cable 302 and weight 303. The steering device causes a force that presses the machining device 100, e.g. its flexible lamellae, in a controlled manner towards the lower edge of the hole and thus makes it possible to sand the collar away.

FIG. 4d illustrates the use of a steering device 301, which in this case comprises cable 302 (but not necessarily the weight 303), when sanding the upper edge of the hole. A force, which presses e.g. the flexible lamellae of the machining device 100 in a controllable manner towards the upper edge of the hole, is effected by e.g. pulling by hand the cable 302.

Figure 4E:
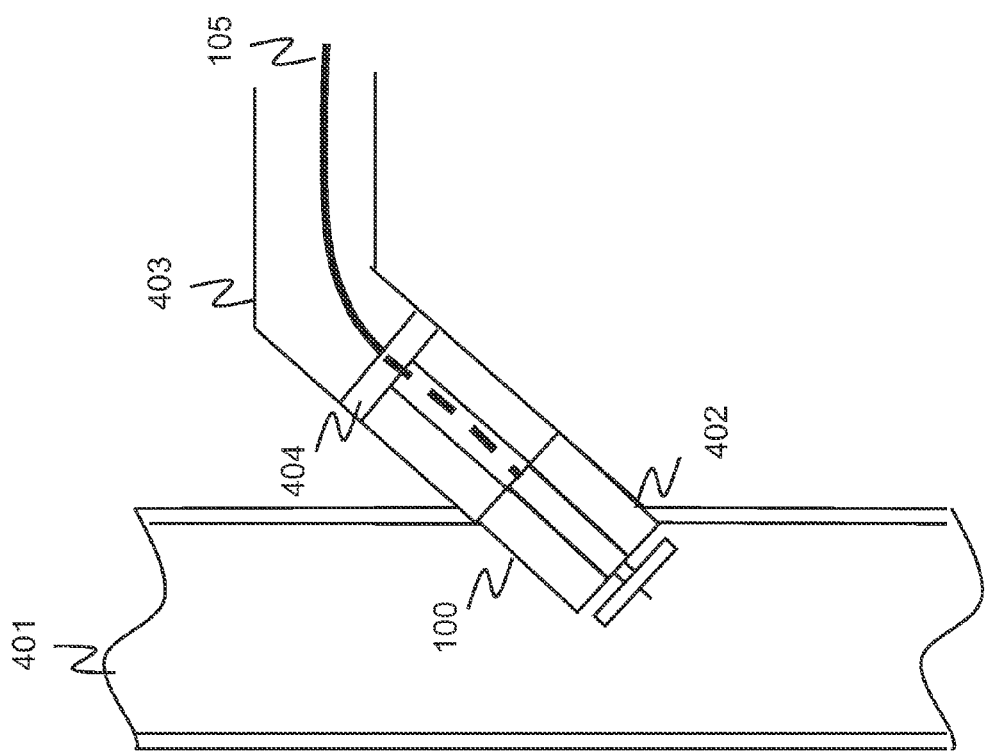
FIG. 4E is a cross-sectional view of the machining device of the present invention inside a pipe system.

FIG. 4e depicts an alternative steering device 404 according to an embodiment of the present invention. The device may for example force the machining device to the direction of the branch line also in the case when the machining device 100 has been partially pushed to the main line 401, away from the branch line 403. The steering device is advantageously such that it may be taken into use (activated) after the machining device has been conveyed to the joint area to be machined. It is apparent to a person skilled in the art, that it is possible to construct various different steering devices, which meet the functional requirements set down herein.

Figure 5B:
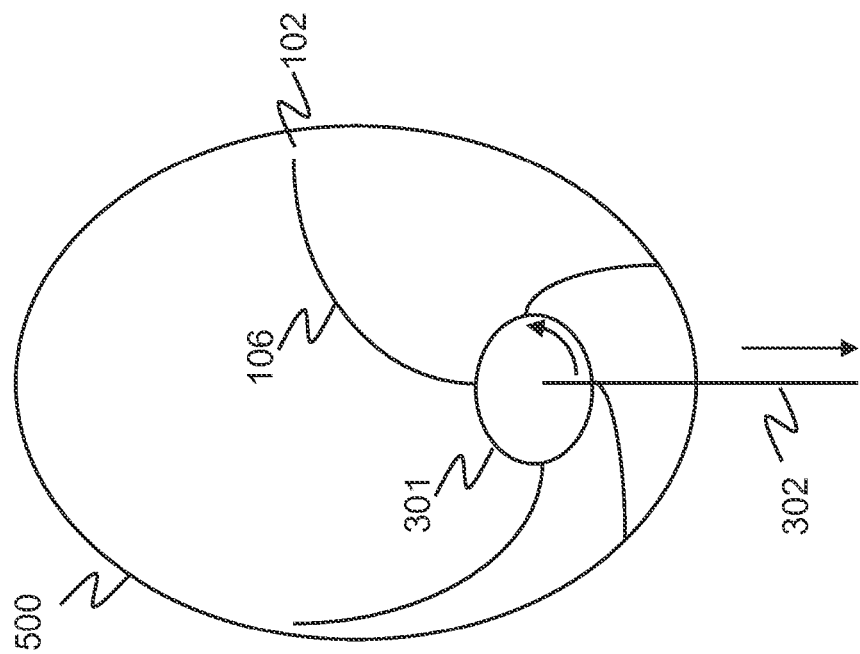
FIG. 5B is a cross-sectional view of the machining device of the present invention used for honing edges of a hole punctured at a joint area of the pipe system.
Figure 5A:
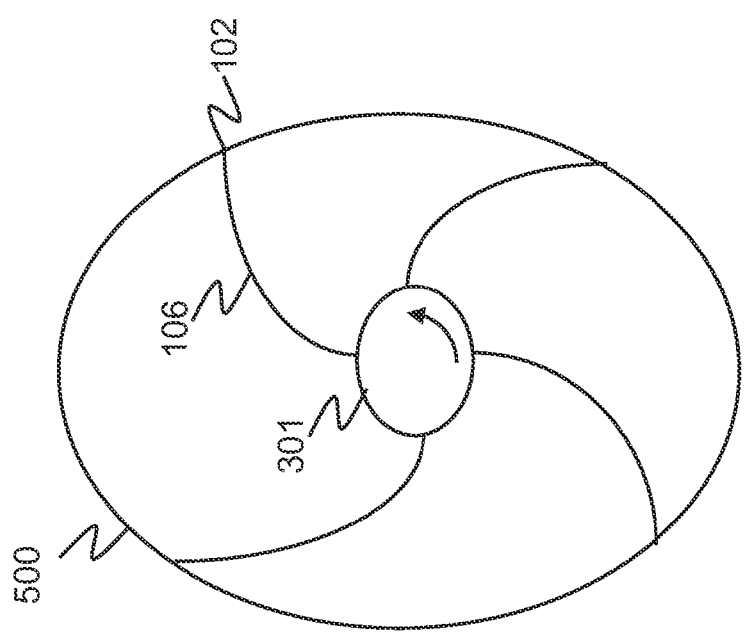
FIG. 5A is a cross-sectional view of the machining device of the present invention used for honing edges of a hole punctured at a joint area of the pipe system.

FIGS. 5a-b depict further the sanding of the edges of the hole. Because the branch line (403 in FIGS. 4a-d) has been joined to the main line (401 in FIGS. 4a-d) at an angle of e.g. 45 degrees, the hole 500 of the joint area drilled from the thinner pipe is not of circular shape but of elliptical shape. If the machining device 100 is allowed to turn in an uncontrollable manner as show in FIG. 4b, the sanding surfaces, e.g. the abrasive band 106 of the flexible protruding parts 102, are able to sand only part of the edges as shown in FIG. 5a. Especially, the upper and lower edges of the hole may remain unprocessed. In order to sand also these, the direction of the machining device is deviated using the steering device 301. The machining device 100 may be deviated, as needed, upwards or downwards using the cable 302 or other suitable steering device as shown also in FIGS. 4c and 4d. This way, a sufficiently high pressure may be set between the edge and the abrasive surface 106 to obtain efficient sanding of the edge.

FIG. 6 depicts the use of the device of an embodiment of the invention for sanding the lining of a pipe having a changing diameter. The pipe system 600 comprises a part having a larger diameter 601 and a smaller diameter 602. It is advantageous to coat such pipe using a single sleeve that has been selected to be suitable for the thicker pipe. Because the diameter of the sleeve is too large for the thinner pipe, a bend 603 is formed into the joint area and further into the thinner pipe. Such bend must be sanded off. The inventor has found out that the device of an embodiment of the invention, e.g. the device 606, showed in more detail in FIGS. 2a and 2b, with or without the blade disc 201, is suitable for removing the bend 603 from the pipe 602 using the blade 605 (201 in FIG. 2) and/or by sanding using the abrasive bands 604 (106 in FIG. 1) attached to the flexible support members (107 in FIG. 1). By suitably dimensioning the flexible abrasive members 604 of the device 606, the same device may be used for sanding both the thinner pipe 602 and the thicker pipe 601. Also the joint area between the thinner and thicker pipe may be honed. The device is also suitable for removing other harmful obstacles, e.g. nails accidentally hit through a sewer pipe, from inside the pipe.

A person skilled in the art understands that the exemplary embodiments described herein are, for the sake of simplicity, rather simple in terms of structure and functionality. It is however possible to construct, utilizing the inventive idea disclosed herein, various different and even very complex solutions.

While the present invention has been described in accordance with preferred compositions and embodiments, it is to be understood that certain substitutions and alterations may be made thereto without departing from the spirit and scope of the following claims.

The invention claimed is:

1. A method for machining a material of a pipe system, comprising:
   providing a joint area between a pipe having a smaller inner diameter and a pipe having a larger inner diameter;
   inserting a machining device into an inside of the pipe having the smaller inner diameter and moving the machining device towards the joint area, the machining device having a rotatable spindle with abrasive and flexible protruding parts extending radially from the spindle;
   centering the spindle of the machining device in the pipe having the smaller inner diameter by rotating the machining device while the flexible protruding parts bearing against an inner wall of the pipe having the smaller inner diameter, removing material from the joint area with the protruding parts by using a steerable actuator of the machining device;
   forming a hole in the joint area by the machining device by puncturing the joint area to produce the hole by using a disk of the machining device and removing material from edges of the hole; and
   controlling a direction of the machining device in relation to a longitudinal axis of the pipe having the smaller inner diameter by a steering device while removing material from edges of the hole.

2. The method according to claim 1 wherein the method further comprises a step of bending the protruding parts to cause an elastic force of the protruding parts against the inner wall of the pipe having the smaller diameter.

3. The method according to claim 1 wherein the steering device comprises a rope or cable for effecting a deviating force.

4. The method according to claim 1 wherein the steering device comprises a weight for effecting a deviating force.

5. A method for machining a material of a pipe system, comprising:
   providing a joint area between a pipe having a smaller inner diameter and a pipe having a larger inner diameter;
   inserting a machining device into an inside of the pipe having the smaller inner diameter and moving the machining device towards the joint area, the machining device having a rotatable spindle with abrasive and flexible protruding parts extending radially from the spindle;
   centering the spindle of the machining device in the pipe having the smaller inner diameter by rotating the machining device while the flexible protruding parts bearing against an inner wall of the pipe having the smaller inner diameter;
   forming a hole in the joint area by the machining device by puncturing the joint area to produce the hole by using a disk of the machining device; and
   removing material from a location of the hole with the protruding parts.

* * * * *